(12) United States Patent
Nakajima et al.

(10) Patent No.: US 11,727,545 B2
(45) Date of Patent: Aug. 15, 2023

(54) IMAGE PROCESSING APPARATUS AND IMAGE CAPTURING APPARATUS

(71) Applicant: CANON KABUSHIKI KAISHA, Tokyo (JP)

(72) Inventors: Michinori Nakajima, Kanagawa (JP); Hidetaka Uemura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 17/116,553

(22) Filed: Dec. 9, 2020

(65) Prior Publication Data

US 2021/0183023 A1 Jun. 17, 2021

(30) Foreign Application Priority Data

Dec. 12, 2019 (JP) ................................ 2019-224225
Sep. 29, 2020 (JP) ................................ 2020-164055

(51) Int. Cl.
*G06T 5/00* (2006.01)
*H04N 23/55* (2023.01)
*H04N 23/68* (2023.01)

(52) U.S. Cl.
CPC ............. *G06T 5/006* (2013.01); *G06T 5/003* (2013.01); *H04N 23/55* (2023.01); *H04N 23/683* (2023.01)

(58) Field of Classification Search
CPC ....... G06T 5/006; G06T 5/003; H04N 5/2254; H04N 5/23267; H04N 5/217; H04N 5/23209; H04N 5/23254; H04N 5/23258; H04N 5/23287; H04N 5/232941; H04N 5/3572; H04N 5/77; H04N 5/23229; H04N 5/76; H04N 9/8042
See application file for complete search history.

(56) References Cited

U.S. PATENT DOCUMENTS 6,188,833 B1 2/2001 Makino et al.
8,063,970 B2 11/2011 Sekiguchi
8,923,401 B2 12/2014 Robinson
9,225,901 B2 12/2015 Shibata
(Continued)

FOREIGN PATENT DOCUMENTS

CN 101815175 A 8/2010
CN 108737726 A 11/2018
(Continued)

OTHER PUBLICATIONS

A Oct. 15, 2021 Russian Notice of Allowance, which is enclosed without an English Translation, that issued in Russian Patent Application No. 2020140415.
(Continued)

*Primary Examiner* — Christopher K Peterson
(74) *Attorney, Agent, or Firm* — Cowan, Liebowitz & Latman, P.C.

(57) ABSTRACT

The image processing apparatus generates recording image data by image capturing through an image capturing optical system, and adds information to the recording image data. When the image capturing optical system is an anamorphic optical system, the apparatus adds, to the recording image data, information on a compression rate of the anamorphic optical system, and information indicating a center position of the anamorphic optical system in each of frame images constituting the recording image data.

17 Claims, 7 Drawing Sheets

(56) References Cited

U.S. PATENT DOCUMENTS

| | | | |
|---|---|---|---|
| 9,607,361 B2 | 3/2017 | Nishigori | |
| 10,043,245 B2 | 8/2018 | Tsubaki | |
| 10,225,624 B2 | 3/2019 | Long et al. | |
| 10,447,944 B2 | 10/2019 | Uemura | |
| 2005/0212931 A1* | 9/2005 | Gallagher | H04N 5/23254 348/E5.046 |
| 2010/0002109 A1* | 1/2010 | Kajimura | H04N 5/232939 348/294 |
| 2010/0238313 A1 | 9/2010 | Ohki et al. | |
| 2010/0321789 A1 | 12/2010 | Kelly | |
| 2011/0128406 A1 | 6/2011 | Shirai | |
| 2011/0298917 A1* | 12/2011 | Yanagita | H04N 13/139 348/135 |
| 2013/0113962 A1 | 5/2013 | Li | |
| 2015/0015687 A1* | 1/2015 | Adler | A61B 1/00096 29/428 |
| 2015/0264246 A1* | 9/2015 | Sartor | H04N 5/77 348/211.3 |
| 2018/0063443 A1 | 3/2018 | Ikeda | |
| 2019/0011679 A1* | 1/2019 | Sasaki | G02B 27/0966 |

FOREIGN PATENT DOCUMENTS

| | | |
|---|---|---|
| EP | 0507297 A2 | 10/1992 |
| EP | 2202968 A1 | 6/2010 |
| EP | 3090564 A1 | 11/2016 |
| JP | 3278206 B2 | 4/2002 |
| JP | 2010-079780 A | 4/2010 |
| JP | 2011-172031 A | 9/2011 |
| JP | 2012-078942 A | 4/2012 |
| JP | 2012-138787 A | 7/2012 |
| JP | 2015-216510 A | 12/2015 |
| JP | 2018-156036 A | 10/2018 |
| JP | 2018-182730 A | 11/2018 |
| RU | 2190934 C1 | 10/2002 |
| RU | 2443068 C2 | 2/2012 |
| WO | 2013/145554 A1 | 10/2013 |

OTHER PUBLICATIONS

The Dec. 16, 2021 Indian Office Action, which is enclosed with an English Translation, that issued in Indian Patent Application No. 202044053519.

A European Search Report dated Apr. 21, 2021, which is enclosed, that issued in the corresponding European Patent Application No. 20213271.8.

A Dec. 7, 2022 Chinese Office Action, which is enclosed with an English Translation, that issued in Chinese Patent Application No. 202011458633.9.

* cited by examiner

ANAMORPHIC LENS IS ATTACHED.
ELECTRONIC IMAGE STABILIZATION
MAY CAUSE INCORRECT IMAGE
CAPTURING
DO YOU WANT OFF OF ELECTRONIC
IMAGE STABILIZATION?

| YES | NO |

FIG. 6

OBJECT

RECORDING IMAGE

DE-SQUEEZED IMAGE

DISTORTION-CORRECTED IMAGE

RECORDING IMAGE AFTER ELECTRONIC IMAGE STABILIZATION

DE-SQUEEZED IMAGE IN CONSIDERATION OF ELECTRONIC IMAGE STABILIZATION

DISTORTION-CORRECTED IMAGE IN CONSIDERATION OF ELECTRONIC IMAGE STABILIZATION

IMAGE PROCESSING APPARATUS AND IMAGE CAPTURING APPARATUS

BACKGROUND OF THE INVENTION

Field of the Invention

The present invention relates to an image processing apparatus and an image capturing apparatus each having an image stabilization function for reducing (correcting) image blur.

Description of the Related Art

An image capturing method is known that compresses (squeezes) an optical image in a horizontal direction by using an anamorphic lens, and performs decompression (de-squeeze) processing as image processing to restore compressed image data obtained by capturing the squeezed optical image, thereby providing a cinescope image (2.39:1). As an image stabilization method for the image thus obtained, Japanese Patent No. 3278206 discloses a method that detects motion vectors from squeezed image data obtained by image capturing using an anamorphic lens, and performs image stabilization processing (electronic image stabilization) on image data de-squeezed by using the motion vectors in consideration of the squeeze by the anamorphic lens.

Further, Japanese Patent Laid-Open No. 2015-216510 discloses an image capturing method that captures and records image data obtained with image stabilization processing, cancels the image stabilization effect in the recorded image data by using information on the image stabilization processing, and then reperforms the image stabilization processing on the image data in which the image stabilization effect has been cancelled.

However, Japanese Patent Laid-Open No. 2015-216510 does not disclose any image stabilization processing suitable for sufficiently correcting distortion and vignetting each peculiar to image capturing using the anamorphic lens.

BRIEF SUMMARY OF THE INVENTION

The present invention provides an image processing apparatus and an image capturing apparatus each capable of performing good image stabilization processing and good correction processing on image data obtained by image capturing using an anamorphic lens.

The present invention provides as an aspect thereof an image processing apparatus including at least one processor or circuit configured to execute a plurality of tasks including an image data generation task configured to generate recording image data by image capturing through an image capturing optical system, and an information addition task configured to add information to the recording image data. The information addition task is configured to add to the recording image data, when the image capturing optical system is an anamorphic optical system, information on a compression rate of the anamorphic optical system, and information indicating a center position of the anamorphic optical system in each of frame images constituting the recording image data.

The present invention provides as another aspect thereof an image capturing apparatus including an image sensor configured to capture an optical image formed by an image capturing optical system, and the above-described image processing apparatus.

The present invention provides as further another aspect thereof an image processing apparatus including at least one processor or circuit configured to execute a plurality of tasks including an information read-out task configured to read out information added to recording image data generated by image capturing, and a post-processing task configured to perform post-processing on the recording image data. The post-processing task is configured to perform on the recording image data, as the post-processing, expansion processing based on a) information on a compression rate of an anamorphic optical system that is an image capturing optical system used in the image capturing, and b) information indicating a center position of the anamorphic optical system in each of frame images constituting the recording image data.

The present invention provides as still another aspect thereof an image processing method including the step of generating recording image data by image capturing through an image capturing optical system, and the step of adding information to the recording image data. At the step of adding the information, when the image capturing optical system is an anamorphic optical system, information on a compression rate of the anamorphic optical system, and information indicating a center position of the anamorphic optical system in each of frame images constituting the recording image data are added to the recording image data.

The present invention provides as yet another aspect thereof an image processing method including the step of reading out information added to recording image data generated by image capturing, and the step of performing post-processing on the recording image data. At the step of performing the post-processing, expansion processing as the post-processing is performed on the recording image data based on information on a compression rate of an anamorphic optical system that is an image capturing optical system used in the image capturing, and information indicating a center position of the anamorphic optical system in each of frame images constituting the recording image data.

Other aspects of the present invention will become apparent from the following description and the attached drawings.

BRIEF DESCRIPTION OF THE DRAWINGS

FIG. 6 illustrates a display example of a user interface in Embodiment 2.

DETAILED DESCRIPTION OF THE EMBODIMENTS

Exemplary embodiments of the present invention will hereinafter be described with reference to the accompanying drawings.

Embodiment 1

Figure 1:
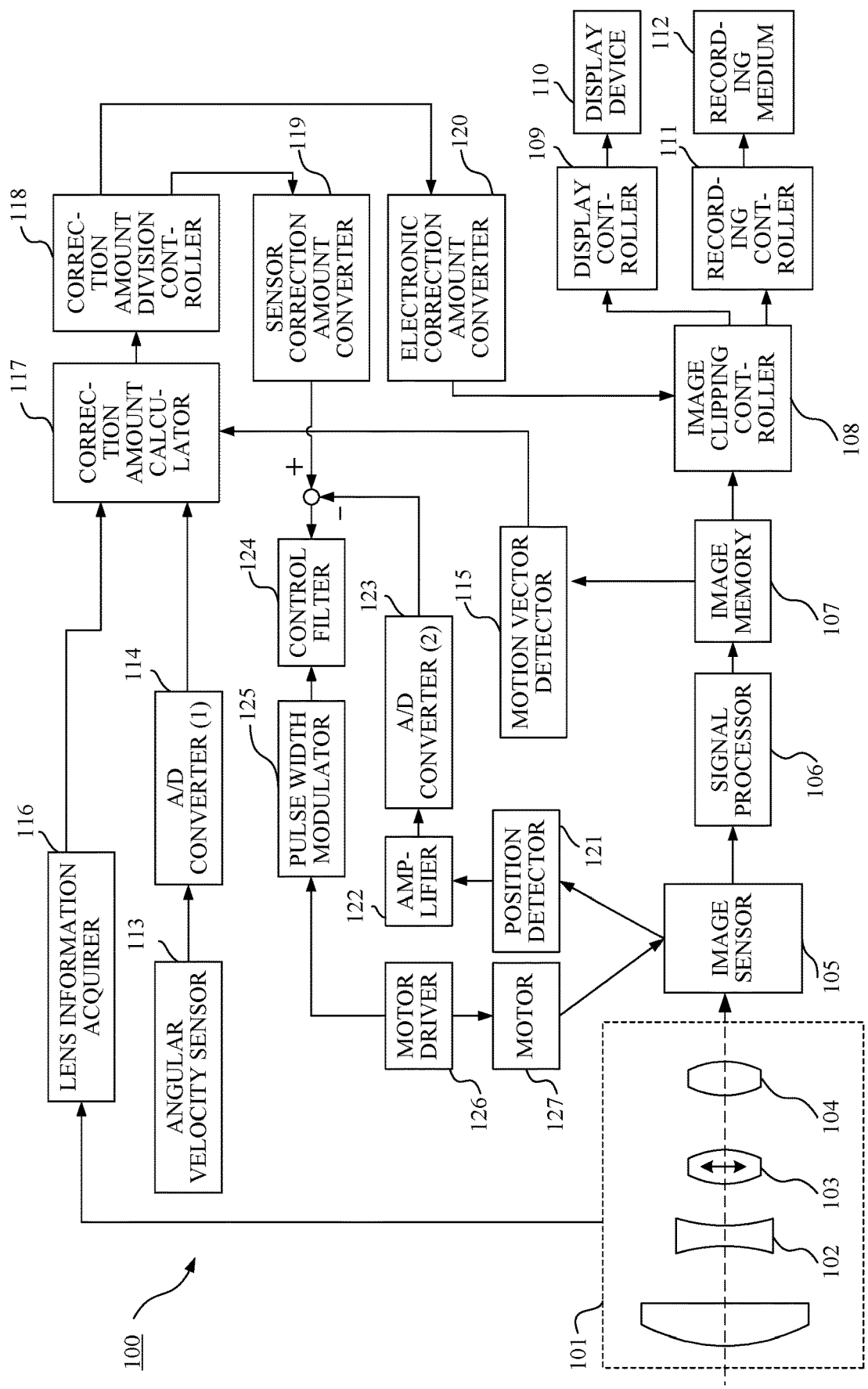
FIG. 1 is a block diagram illustrating a configuration of an image capturing apparatus that is an embodiment of the present invention.

FIG. 1 illustrates a configuration of an image capturing apparatus including an image processing apparatus that is a first embodiment (Embodiment 1) of the present invention. The image capturing apparatus of this embodiment is a lens-interchangeable or a lens integrated digital camera. Other embodiments of the present invention include various image capturing apparatuses other than the above digital cameras.

Figure 2:
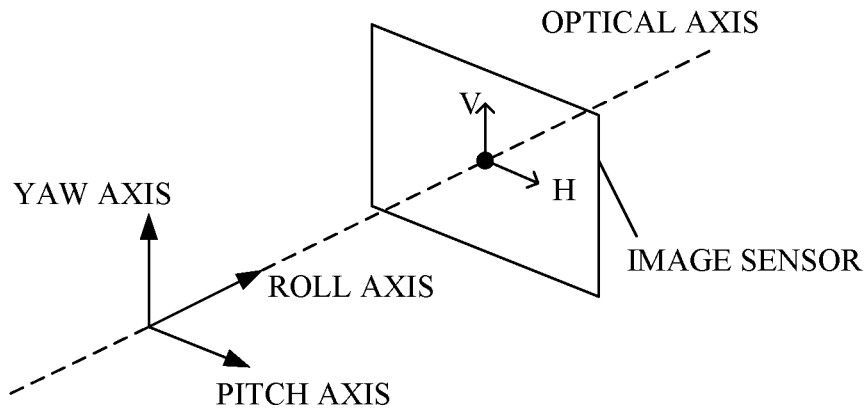
FIG. 2 illustrates a coordinate system in Embodiments 1 and 2 of the present invention.

In this embodiment, a shake applied to the image capturing apparatus due to user's hand jiggling or the like is referred to as "a camera shake", and blur of a captured image caused by the camera shake is referred to as "image blur". Further, as illustrated in FIG. 2, an axis extending in a vertical direction (a central axis of horizontal rotation) in a plane orthogonal to an optical axis of an image capturing optical system is referred to as "Yaw axis", and an axis extending in a horizontal direction (a central axis of vertical rotation) is referred to as "Pitch axis". Moreover, an axis extending in an optical axis direction (a central axis of rotation around the optical axis) is referred to as "Roll axis".

In FIG. 1, an image capturing lens as the image capturing optical system 101 includes a zoom lens 102 for performing zooming, a shift lens serving as a correction lens 103 for performing optical image blur correction (lens image stabilization), a focus lens 104 for performing focusing, and a diaphragm (not illustrated) for adjusting a light amount. The image capturing lens 101 causes light from an object (not illustrated) to form an optical image (object image) on an image sensor 105.

The image sensor 105 constituted by a CMOS sensor or the like photoelectrically converts the optical image formed by the image capturing lens 101 to generate an image capturing signal, and outputs the image capturing signal to a signal processor 106. The image sensor 105 is shifted by a motor 127 in the horizontal and vertical directions in the plane orthogonal to the optical axis, and is rotated by the motor 127 about the optical axis. This makes it possible to perform sensor image stabilization as image blur correction by the movement (shift and rotation) of the image sensor 105.

The signal processor 106 performs signal processing such as white balance adjustment and gamma correction on the image capturing signal output from the image sensor 105 to generate captured image data (constituted by a plurality of frame images) as moving image data. The captured image data is stored in an image memory 107.

An image clipping controller (electronic image stabilization unit) 108 clips a predetermined partial image area (hereinafter referred to as a "clipping area") of each frame image of the captured image data stored in the image memory 107 to generate new frame images constituting recording and displaying image data, and then outputs the new frame images to a recording controller 111 and a display controller 109. At this time, the clipping area is moved (shifted or rotated) in response to the camera shake to perform electronic image stabilization for correcting (reducing) image blur, which is movement of the object between the frame images caused by the camera shake.

The processing performed by the signal processor 106 and the image clipping controller 108 for generating the recording and display image data is executed at 60 Hz cycle when the image capturing signal is an image signal conforming to NTSC format. That is, in this embodiment, the signal processor 106 and the image clipping controller 108 constitute an image data generating unit that generates recording image data.

The display controller 109 displays the displaying image data output from the image clipping controller 108 as a live-view image on a display device 110, and displays a menu image for allowing user's various settings and recorded image data on the display device 110. The display device 110 is constituted by a liquid crystal display element (LCD) or the like.

The recording controller 111 controls recording and reading of image data, meta information and the like to and from a recording medium 112. The recording medium 112 is constituted by a semiconductor memory, a hard disk, or the like.

An angular velocity sensor 113 detects the camera shakes about the Yaw axis, Pitch axis and Roll axis applied to the image capturing apparatus 100 to output a shake signal having a voltage value indicating an angular velocity of each camera shake. An A/D converter (1) 114 converts the shake signal (voltage signal) output from the angular velocity sensor 113 into angular velocity data as digital data, and outputs the angular velocity data to a correction amount calculator 117.

A motion vector detector 115 detects motion vectors in the horizontal and vertical directions in the plane orthogonal to the optical axis by using, for example, a block matching method. The motion vector detector 115 may detect the motion vector by using a correlation method instead of the block matching method.

In the block matching method, the motion vector detector 115 divides an input frame image into a plurality of blocks (each block is an area of, for example, 16×16 pixels), and calculates a difference of each block (target block) from a previous frame image. Then, the motion vector detection unit 115 searches for a block of the previous frame image in which the sum of absolute values of the differences is minimized, and detects a relative shift between the block specified as a result of the search and the target block as a motion vector in the target block. In this way, the horizontal and vertical motion vectors of each pixel of the frame image are detected. The detected horizontal motion vector is sent as H_Vect and the detected vertical motion vector is sent as V_Vect to the correction amount calculator 117.

A lens information acquirer 116 acquires information indicating characteristics of the image capturing lens 101 (hereinafter referred to as "optical system information"). The optical system information includes a focal length, an aperture stop value, a focus position, a shift lens movement amount, a distortion amount, a compression rate of an anamorphic lens described later, a central position and a diameter of an effective image circle, and the like. When the image capturing lens 101 is an interchangeable lens, the optical system information may be acquired by communicating with the interchangeable lens or by being input by a user via a user interface provided in the image capturing apparatus 100. The acquired optical system information is sent to the correction amount calculator 117.

The correction amount calculator 117 calculates a correction amount for correcting the image blur caused by the camera shake, and sends it to a correction amount division controller 118. The correction amount calculator 117 calculates not a correction amount by each of the above-described lens image stabilization, sensor image stabilization and electronic image stabilization, but a correction amount (hereinafter referred to as "a total correction amount") by all of the lens image stabilization, sensor image stabilization and electronic image stabilization.

The correction amount division controller 118 divides the total correction amount calculated by the correction amount calculator 117 into respective correction amounts by the lens image stabilization, sensor image stabilization and electronic image stabilization. However, in the following description, a case where only the image stabilization and the electronic image stabilization are performed will be described. In this case, the correction amount calculator 117 divides the total correction amount into a correction amount by the sensor image stabilization (hereinafter referred to as "a sensor correction amount") and a correction amount by the electronic image stabilization (hereinafter referred to as "an electronic correction amount").

A sensor correction amount converter 119 converts the sensor correction amount from the correction amount division controller 118 into a movement amount of the image sensor 105, and outputs a target position of the image sensor 105 (hereinafter referred to as "a sensor target position") corresponding to the movement amount. An electronic correction amount converter 120 converts the electronic correction amount from the correction amount division controller 118 into a clipping position that indicates a center position of the clipping area in the image clipping controller 108, and sets the clipping position to the image clipping controller 108.

A position detector 121 outputs a sensor position signal having a voltage value indicating the position of the image sensor 105. The sensor position signal is amplified to a signal in a predetermined voltage range by an amplifier 122, and then converted into sensor position data (deviation data) as digital data by an A/D converter (2) 123.

A control filter 124 performs signal processing such as amplification and phase compensation on the sensor position data, and sends the sensor position data after the signal processing to a pulse width modulator 125.

The pulse width modulator 125 converts the sensor position data from the control filter 124 into a PWM signal, and outputs the PWM signal to a motor driver 126. The motor 127 is configured by a voice coil motor or the like, and is driven by the PWM signal from the motor driver 126 to move the image sensor 105 in the horizontal and vertical directions. The position of the moved image sensor 105 is detected by the position detection unit 121, and the detected position is used for next calculation of the sensor position data. As a result, feedback control is performed so that difference between the sensor target position and the sensor position data becomes small. The control filter 124, the pulse width modulator 125, the motor driver 126 and the motor 127 constitute a sensor image stabilization unit.

Figure 3:
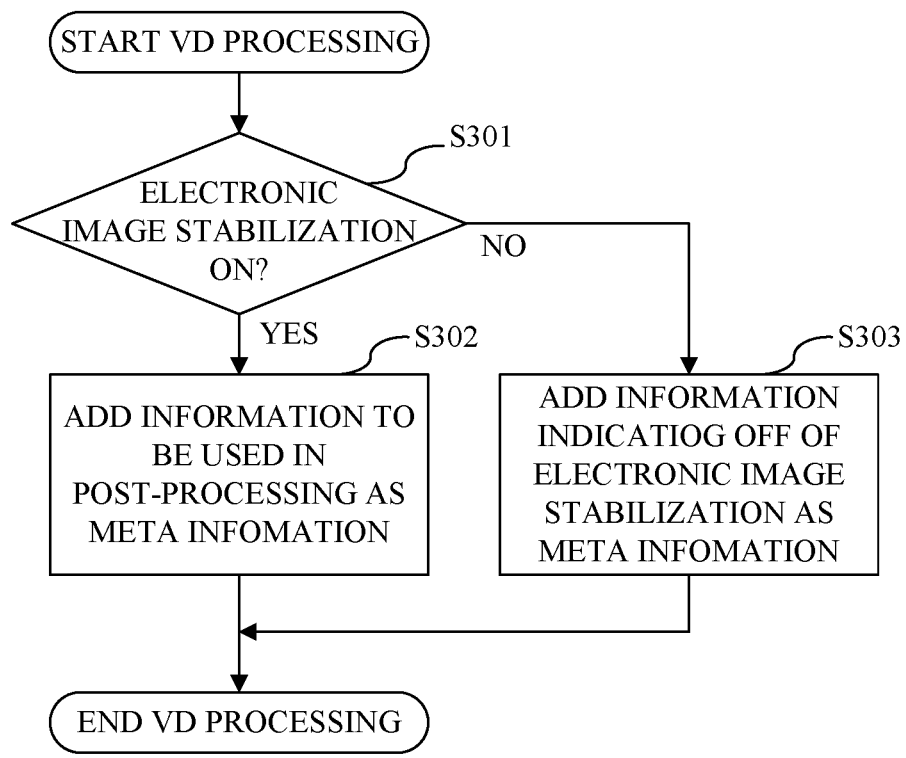
FIG. 3 is a flowchart of processing performed in Embodiment 1.

The flowchart of FIG. 3 illustrates processing for adding the meta information to the recording image data (frame images). This processing is VD (Vertical Driving Pulse) processing performed for each frame image. The signal processor (image data generation unit and information addition unit) 106 as a computer repeatedly executes this processing at a predetermined cycle (for example, 60 Hz) according to a computer program. Hereinafter, a case where the image capturing lens 101 is an anamorphic lens (anamorphic optical system) will be described.

First, at step S301, the signal processor 106 determines whether or not execution of the electronic image stabilization is selected (ON) by a user. The signal processor 106 proceeds to step S302 if it is ON, and otherwise proceeds to step S303. At step S303, the signal processor 106 adds the meta information indicating that electronic image stabilization is OFF to the frame image, and records the frame image.

On the other hand, at step S302, the signal processor 106 adds, for each frame image, information to be used in post-processing on the frame image after the electronic image stabilization as meta information, and records each frame image. The information to be used for the post-processing includes information on the compression rate of the anamorphic lens, information on the clipping position in the electronic image stabilization, and information on a clipping magnification ratio of the clipping area. Further, the information to be used for the post-processing also includes information on a roll angle that is a tilt angle of the frame image about an optical center position, and information on distortion of the frame image caused by rolling shutter distortion, optical distortion of the image capturing lens 101, and the like. The "information on A" used herein includes not only information directly indicating "A" but also information indirectly indicating "A" such as information convertible into "A".

The information on the compression rate of the anamorphic lens may be, for example, information directly indicating the compression rate (½, 1/1.3, etc.) determined for each attached anamorphic lens. Alternatively, the information on the compression rate may be table numbers convertible into compression rates (No. 1 corresponding to ½, No. 2 corresponding to 1/1.3, etc.). Further, the information on the compression rate may be table data in which model numbers of interchangeable lenses and their compression rates are mutually related, which makes it possible to acquire the compression rate from the model number of the attached interchangeable lens. The information on the clipping position is represented by, for example, as described above, the center position (horizontal and vertical coordinates) of the clipping area.

For example, in a frame image of 3840×2160 pixels, a position (1920, 1080) indicates that the center position of the clipping area in the electronic image stabilization coincides with an optical axis position of the image capturing lens 101, that is, the optical center position. Further, a position (0, 0) when the center position of the clipping area in the electronic image stabilization is represented as an offset position from the optical center position also indicates that the center position of the clipping area is located at the optical center position.

The information on the clipping magnification ratio may be, for example, information directly indicating a clipping magnification ratio of 0.9 if an angle of view of the image after the electronic image stabilization is 0.9 times an image capturing angle of view, or may be table numbers convertible into clipping magnification ratios.

The information on the roll angle may be, for example, information directly indicating a roll angle of 0.5 if the roll angle corrected by the electronic image stabilization is 0.5 degrees, or may be table numbers convertible into roll angles.

The information on the distortion may be, for example, information indicating distortion aberration determined by the interchangeable lens and its state such as its focal length and focus position, or may be information directly indicating a distortion parameter corresponding to the distortion aberration or information convertible into the distortion parameter.

However, performing roll correction and distortion correction together with the electronic image stabilization during image capturing makes it difficult to remove correction components in subsequent processing as the post-processing. Therefore, when the anamorphic lens is used and the electronic image stabilization is performed, it is preferable to limit (disable) correction processing such as the roll correction and the distortion correction.

Figure 4:
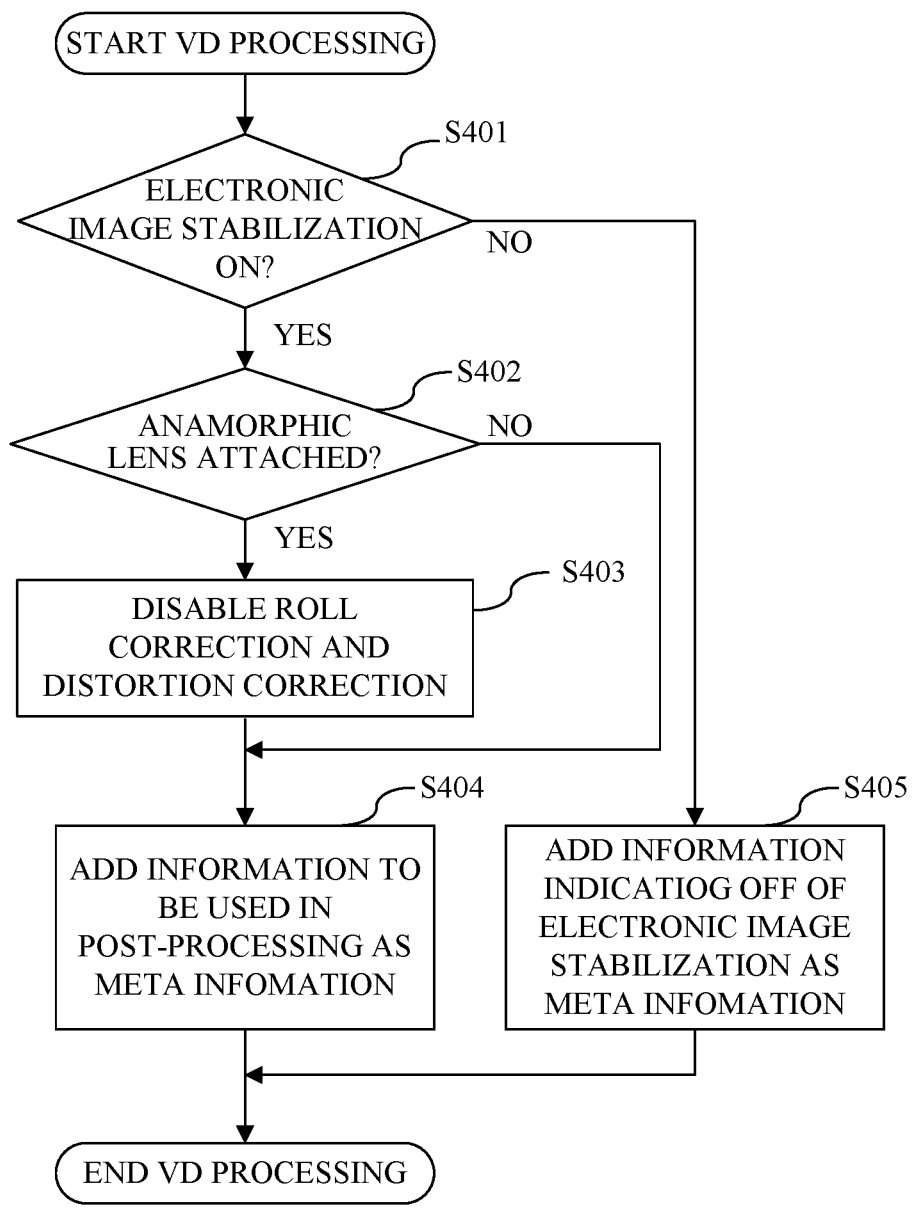
FIG. 4 is a flowchart of other processing performed in Embodiment 1.

The flowchart of FIG. 4 illustrates processing for limiting the correction processing when the anamorphic lens is used and the electronic image stabilization is performed. At step S401, the signal processor 106 determines whether or not execution of the electronic image stabilization is selected (ON) by the user. The signal processor 106 proceeds to step S402 if it is ON, and otherwise proceeds to step S405. At step S405, the signal processor 106 adds the meta information indicating that electronic image stabilization is OFF to the frame image and records the frame image.

On the other hand, at step S402, the signal processor 106 determines whether or not the image capturing lens 101 is the anamorphic lens. The signal processor 106 skips step S403 to proceeds to step S404 if the image capturing lens 101 is the anamorphic lens, and otherwise proceeds to step S403.

At step S403, the signal processor 106 disables the roll correction and the distortion correction, and proceeds to next step S404.

At step S404, the signal processor 106 adds the above-described information to be used in the post-processing as the meta information to each frame image, and records each frame image.

As described above, in this embodiment, when the electronic image stabilization is performed (ON), the information to be used in the post-processing for the frame image after the electronic image stabilization is added to each frame image, and each frame image is recorded with the information. This makes it possible to facilitate the post-processing including expansion processing (de-squeeze processing), and the distortion and vignetting correction processing based on the optical center position.

When the compression rate of the interchangeable lens as the anamorphic lens cannot be automatically acquired through communication with the interchangeable lens, the compression rate selected by a user's operation may be recorded. In this case, it is preferable to provide, in the post-processing, a user interface allowing the user to select whether the compression rate recorded is used or the compression rate specified in the post-processing is used so as not to be unable to cope with a wrong recorded compression rate.

Embodiment 2

Figure 5:
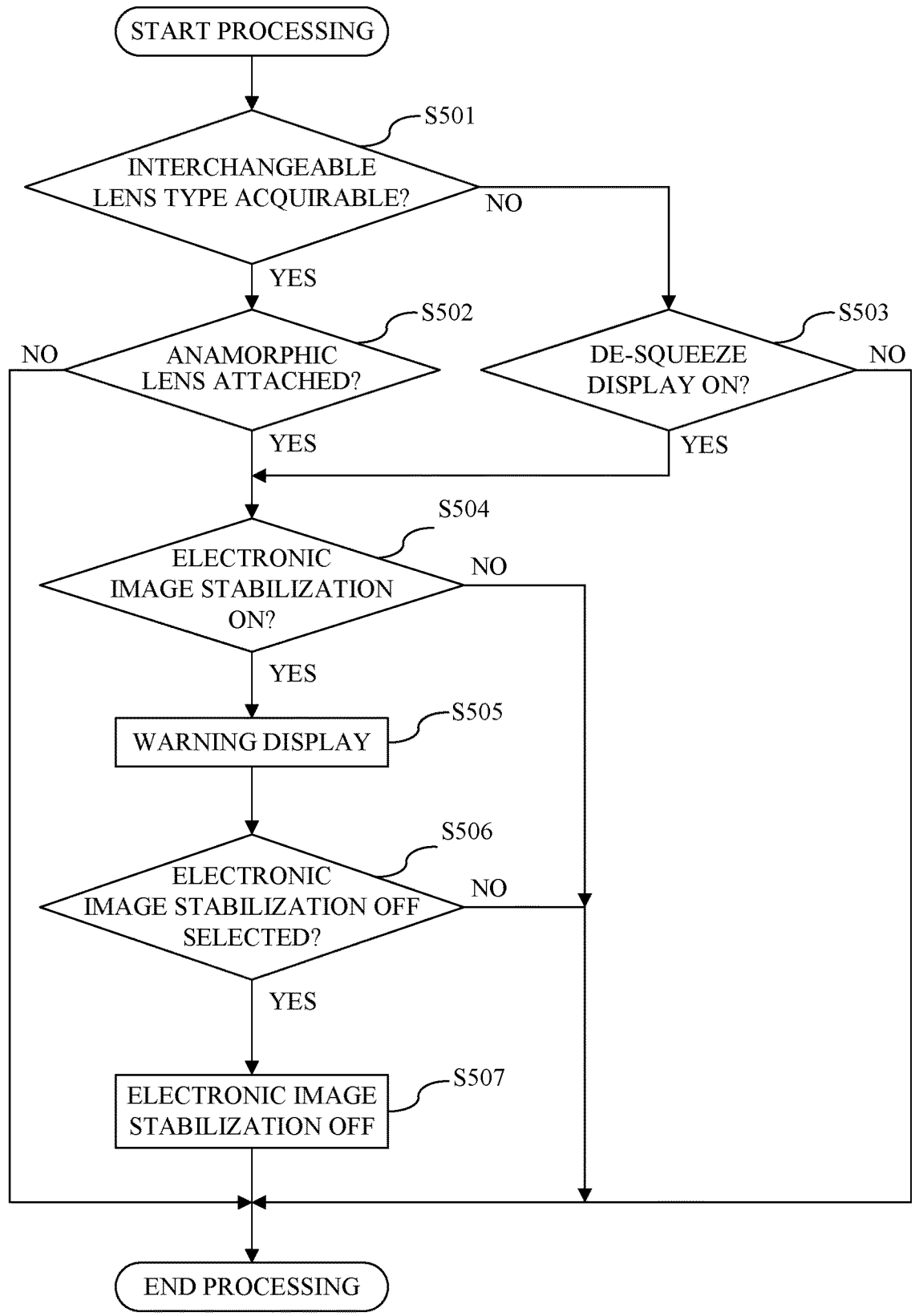
FIG. 5 is a flowchart of processing performed in Embodiment 2.

Next, description will be made of a second embodiment (Embodiment 2) of the present invention with reference to FIG. 5. A basic configuration of an image capturing apparatus of this embodiment is the same as that of the image capturing apparatus 100 of Embodiment 1. In this embodiment, description will be made of a case where all the functions that may affect the post-processing are disabled when the image capturing lens 101 is an anamorphic lens.

When the interchangeable lens as the anamorphic lens does not have a function of communicating with the image capturing apparatus, the image capturing apparatus cannot detect the attachment of the interchangeable lens. In this case, the image capturing apparatus determines whether or not the anamorphic lens whose information cannot be acquired by communication is attached depending on a user's selection of ON or OFF of de-squeeze display that is horizontal expansion display processing (display processing including expansion processing) of image data.

At step S501, the signal processor 106 determines whether or not information indicating type of the interchangeable lens can be acquired through communication with the interchangeable lens. The signal processor 106 proceeds to step S502 if the information can be acquired, and otherwise proceeds to step S503.

At step S503, the signal processor 106 determines whether or not the de-squeeze display is set to ON. The signal processor 106 proceeds to step S504 if it is set to ON, and otherwise ends the processing.

On the other hand, at step S502, the signal processor 106 determines whether or not the anamorphic lens is attached to the image capturing apparatus. The signal processor 106 proceeds to step S504 if the anamorphic lens is attached, and otherwise ends the processing.

At step S504, the signal processor 106 determines whether or not execution of the electronic image stabilization is selected (ON) by a user. The signal processor 106 proceeds to step S505 if it is ON, and otherwise ends the processing.

At step S505, the signal processor 106 as a controller performs a warning display (warning operation) indicating a possibility that correct image capturing cannot be performed using the anamorphic lens. Further, at next step S506, the signal processor 106 displays, as illustrated in FIG. 6, a user interface for allowing the user to select whether to turn off the electronic image stabilization. when the electronic image stabilization is selected to be OFF, the signal processor 106 proceeds to step S507 to turn the electronic image stabilization to OFF, and then ends the processing. When the electronic image stabilization is selected to be ON, the signal processor 106 ends the processing.

As described above, in this embodiment, when the anamorphic lens is attached to the image capturing apparatus, the electronic image stabilization is turned off. This makes it possible to facilitate the post-processing including expansion processing, and distortion and vignetting correction processing based on the optical center position.

Although this embodiment has described the case where only the electronic image stabilization is turned off, other functions such as the roll correction and distortion correction that are difficult to be performed in the post-processing after the electronic image stabilization is performed during image capturing may be also turned off as in Embodiment 1.

Further, each of the above embodiments has described the case where the image processing apparatus is built in the image capturing apparatus. However, a personal computer capable of performing electronic image stabilization and post-processing on image data acquired from an image capturing apparatus may be used as an image processing apparatus.

Embodiment 3

Next, description will be made of a third embodiment (Embodiment 3) of the present invention with reference to FIGS. 7A to 7G. This embodiment will describe how an editing apparatus uses the information added to the recording image data (hereinafter also referred to as "recorded image") in the above embodiments. In addition, in each of FIGS. 7A to 7G, in order to make the optical center position (optical axis position) of the image capturing optical system easy to understand, the optical center position is illustrated by a black point.

Figure 7A:
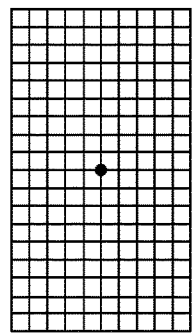
FIGS. 7A to 7G illustrate a recorded image and an image after editing processing in Embodiment 3 of the present invention.
Figure 7B:
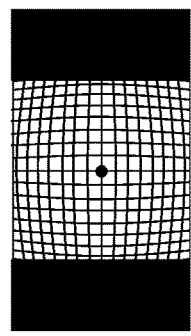

FIG. 7A illustrates an image of an object to be captured. When the image is captured using the anamorphic lens, as illustrated in FIG. 7B the recorded image is recorded as image data compressed in the right and left direction. The editing apparatus as an image processing apparatus performs de-squeeze processing on the recorded image based on the optical center position to restore the compressed recorded image to obtain a de-squeezed image as illustrated in FIG. 7C.

Figure 7C:
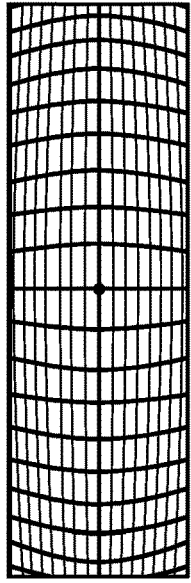
Figure 7D:
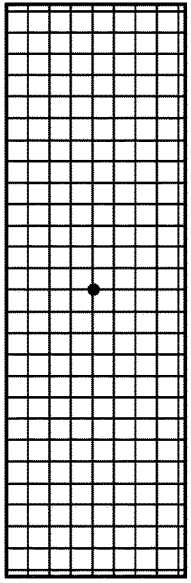

Further, the editing apparatus corrects the de-squeezed image distorted by the anamorphic lens to convert it into an image illustrated in FIG. 7D. The editing apparatus performs various color management processes on the distortion-corrected image to produce a completed image. Currently, a user captures images of a grid chart and the like, calculates distortion amounts at various lens positions from the captured images, and uses the calculated distortion amounts as distortion correction data in the distortion correction processing. When the user likes a distorted image, processing for re-adding distortion to the completed image is performed.

As can be seen from FIG. 7B, distortion aberration of the anamorphic lens occurs based on the optical center position. Further, even in the right and left compression peculiar to the anamorphic lens, the compression rate becomes larger as the distance from the optical center position increases. If the electronic image stabilization is performed when the anamorphic lens having such characteristics is attached to the image capturing apparatus, the optical center position is shifted. Moreover, since clipping processing by electronic enlargement is performed in the process of performing the electronic image stabilization, a distortion different from the distortion correction amount acquired in advance by the user appears.

When the de-squeeze processing of FIG. 7C and the distortion correction processing of FIG. 7D are performed on the image including such distortion on the premise that the center of the recorded image is located at the optical center position, incorrect de-squeeze processing and distortion correction processing are performed. For this reason, it is necessary to perform the above-described processing using the clipping position and the clipping magnification ratio included in the meta information.

Figure 7E:
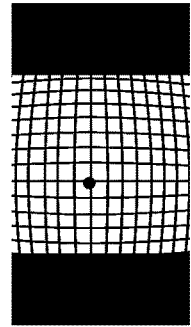

FIG. 7E illustrates a recorded image obtained by the electronic image stabilization performed on the image captured using the anamorphic lens. This recorded image is an image slightly enlarged compared to the recorded image of FIG. 7B. This is an example of a frame image recorded with the optical center position shifted from the center of the frame image.

Figure 7F:
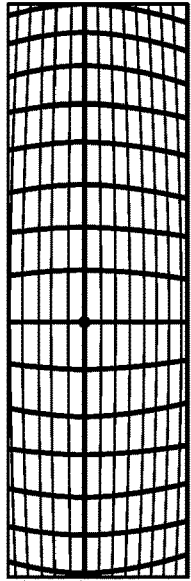

On the other hand, FIG. 7F illustrates an image after the de-squeeze processing performed in consideration of the clipping magnification (enlargement) ratio and the clipping position included in the meta information added to the frame image of FIG. 7E, that is, in consideration of the optical center position.

Figure 7G:
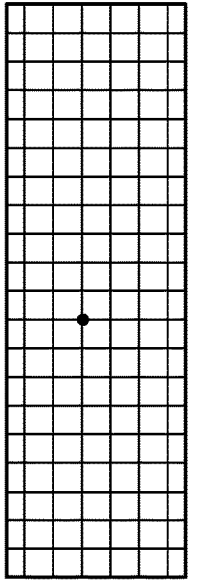

Further, FIG. 7G illustrates an image after the distortion correction processing performed in consideration of the clipping magnification ratio and the clipping position included in the meta information added to the frame image of FIG. 7E, that is, in consideration of the optical center position. The images of FIGS. 7F and 7G are images obtained by proper de-squeeze processing and distortion correction processing.

Figure 8:
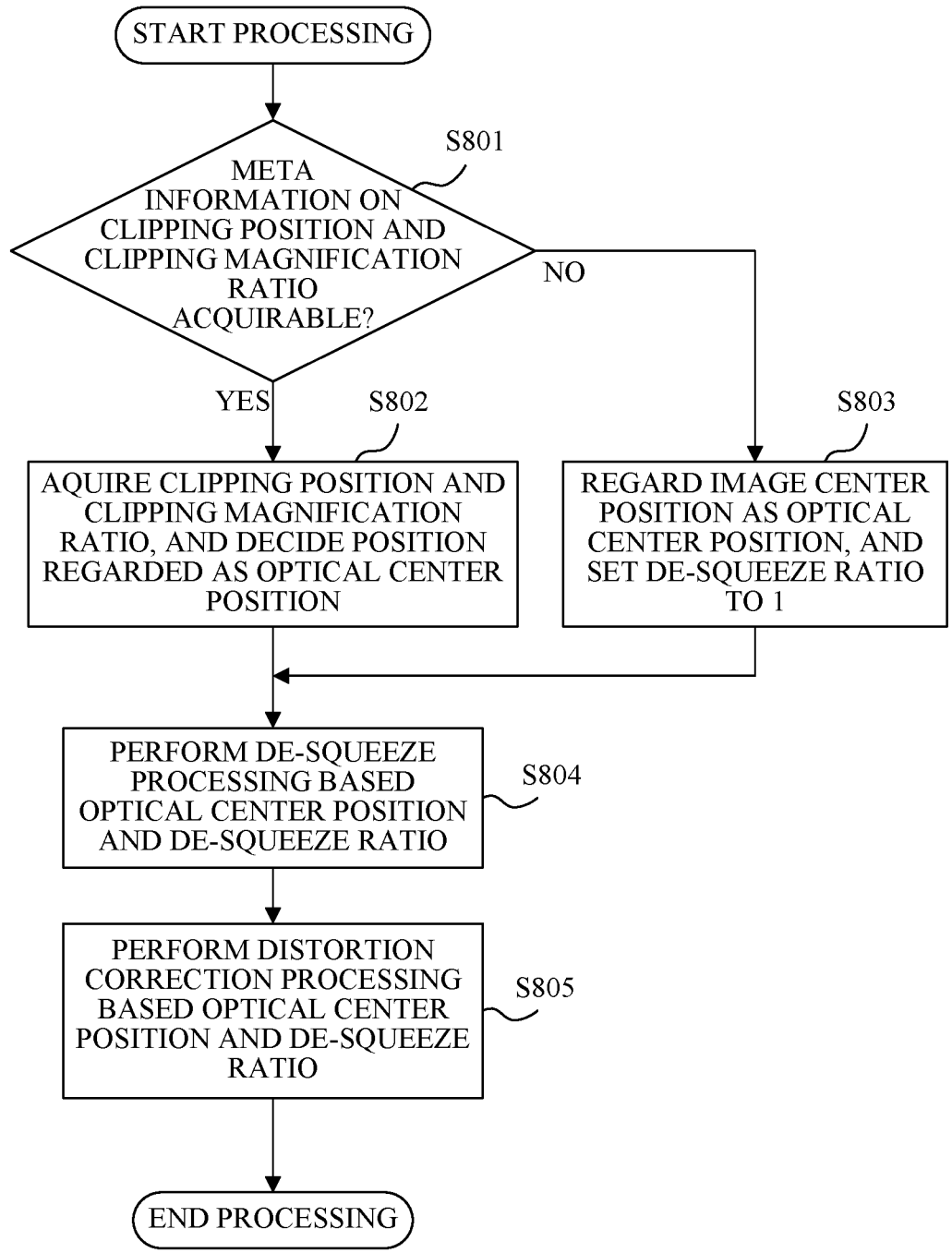
FIG. 8 is a flowchart of processing performed in Embodiment 3.

The flowchart of FIG. 8 illustrates processing performed by the editing apparatus for performing the de-squeeze processing and the distortion correction processing on each frame image of a recorded image obtained by the electronic image stabilization on a captured image captured using the anamorphic lens. The editing apparatus includes an information reading unit and a post-processor.

At step S801, the editing apparatus determines whether or not the recorded image includes the meta information including the clipping position and the clipping magnification ratio in the electronic image stabilization. The editing apparatus proceeds to step S802 if such meta information is included, and otherwise proceeds to step S803.

At step S802, the editing apparatus reads out the meta information, acquires the clipping position and the clipping magnification ratio, and decides a position regarded as the optical center position. Then, the editing apparatus proceeds to step S804.

On the other hand, at step S803, the editing apparatus regards the center position of the recorded image (frame image) as the optical center position, and sets an enlargement ratio (de-squeeze ratio) to 1. Then, the editing apparatus proceeds to step S804.

At step S804, the editing apparatus restores the compression of the recorded image by performing the de-squeeze processing based on the decided optical center position and de-squeeze ratio, and then proceeds to step S805. At this step, when the compression rate of the anamorphic lens recorded in the meta information, its reciprocal may be used as the de-squeeze ratio, or a de-squeeze ratio set arbitrarily by the user may be used. When the image capturing lens attached to the image capturing apparatus is not an anamorphic lens, performing de-squeeze processing of 1× is equivalent to performing no processing at all.

At step S805, the editing apparatus performs the distortion correction processing based on the decided optical center position and de-squeeze ratio. At this step, the processing to be performed is not limited to the distortion correction processing, that is, other correction processing may be performed based on the determined optical center position and de-squeeze ratio. Further, although this embodiment has described only the electronic image stabilization, when a function of the optical image stabilization or the sensor image stabilization is provided, it is desirable to also record information on position of the correction lens or the image sensor as the meta information.

As described above, each of Embodiments 1 to 3 realizes an image processing apparatus and an image capturing apparatus each capable of performing good image stabilization processing and good correction processing on image data obtained by image capturing using an anamorphic lens.

OTHER EMBODIMENTS

The present invention is not limited to the above-described embodiments, and various variations and modifications may be made without departing from the scope of the present invention.

For example, each of the above embodiments uses the information indicating the clipping position as the information indicating the optical center position, but information indicating an optical center position of a clipped image may be directly used.

For example, in a frame image of 3840×2160 pixels, when the center position of the clipping area coincides with the optical center position, the coordinates of the optical center position in the clipped image are (1920, 1080). On the other hand, when the clipping position is shifted upward in the image sensor (that is, the image capturing apparatus is moved downward), the coordinates of the optical center position in the clipped image are shifted from the center position of the clipped image as (1920, 1500). Information indicating these coordinates may be added to the image data as information indicating the optical center position in each frame image.

Further, instead of these coordinates, an offset position (0, 420) from the center position of the clipped image may be used. The coordinates (0, 420) also indicate that the clipping position is shifted upward.

Moreover, each of the above-described embodiment has described the image capturing apparatus having the electronic image stabilization function, but other image stabilization methods can be employed. As described above, when performing the expansion processing, the distortion correction processing, the vignetting correction processing and the like, it is preferable to base the optical center position. On the other hand, even when performing the sensor image stabilization that moves the image sensor in directions intersecting the optical axis or the lens image stabilization that moves the correction lens in the directions intersecting the optical axis, it is difficult to specify the optical center position from the image data. Therefore, adding the information indicating the optical center position in each frame image to the image data as described in each of the above-described embodiments makes it easy to perform the expansion processing and the correction processing in the post-processing using the optical center position.

In addition, a plurality of image stabilization methods may be used together. For example, when the electronic image stabilization and the sensor image stabilization are used together, the information on the clipping position and information on position of the image sensor may be added to each frame image, and the editing apparatus may calculate the optical center position based on the clipping position and the position of the image sensor. As described above, the information indicating the optical center position includes not only information directly indicating the optical center position, but also information enabling specifying the optical center position.

Further, each of the above-described embodiments has described an example in which the correction processing such as the distortion correction processing and the vignetting correction processing is performed. However, even when such correction processing is not performed, since the expansion processing can be performed using the information indicating the optical center position, the effects achieved by adding the information indicating the optical center position in each frame image to the recorded image can be obtained.

Moreover, an image capturing apparatus having no image stabilization function is also an embodiment of the present invention. For example, there is an image capturing apparatus having, as a function other than the electronic image stabilization function, a function of clipping a part of an captured frame image and recording the clipped frame images whose clipping positions are changed according to movement of an object to be tracked. When the optical center position moves in the frame images by this function, the image capturing apparatus is also an embodiment of the present invention.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-224225, filed on Dec. 12, 2019 and 2020-164055, filed on Sep. 29, 2020 which are hereby incorporated by reference herein in their entirety.

What is claimed is:

1. An image processing apparatus comprising:
at least one processor or circuit configured to execute a plurality of tasks including:
an image data generation task configured to generate recording image data by performing, on each of frame images of captured image data generated by image capturing through an image capturing optical system, electronic image stabilization that clips a part of the frame image of the captured image data so as to reduce image blur; and
an information addition task configured to add meta information to the recording image data,
wherein each frame image of the recording image data is data of image area clipped by the electronic image stabilization, and
wherein the information addition task is configured to add to the recording image data, when the image capturing optical system is an anamorphic optical system, the meta information including a) information on a compression rate of the anamorphic optical system, and b) information on a clipping position of the image area in the electronic image stabilization.

2. The image processing apparatus according to claim 1, wherein
the information addition task is configured to add to the recording image data, the meta information including information on a clipping magnification ratio of the image area.

3. The image processing apparatus according to claim 2, wherein the information addition task is configured to further add to the recording image data, the meta information including c) information on a roll angle of the frame image of the recording image data, and d) information on distortion of the frame image of the recording image data.

4. The image processing apparatus according to claim 1, wherein the information addition task is configured to add to the recording image data, when information acquired from an interchangeable lens including the image capturing optical system indicates that the image capturing optical system is the anamorphic optical system, the meta information including the information on the compression rate and the information indicating the center position.

5. The image processing apparatus according to claim 1, wherein:
the plurality of tasks further includes a processing task configured to perform, on the frame image of the recording image data, correction processing including at least one of roll correction and distortion correction; and
the processing task is configured to limit the correction processing when the image capturing optical system is the anamorphic optical system.

6. The image processing apparatus according to claim 1, wherein the information on the compression rate is information based on a compression rate input by a user.

7. The image processing apparatus according to claim 1, wherein the information of the clipping position of the image area in the electronic image stabilization is information indicating a relation between the clipping position of the image area in the electronic image stabilization and a center position of the anamorphic optical system.

8. The image processing apparatus according to claim 7, wherein the relation between the clipping position of the image area in the electronic image stabilization and the center position of the anamorphic optical system changes depending on correction amount of the electronic image stabilization.

9. The image processing apparatus according to claim 1, wherein the information on the clipping position of the image area in the electronic image stabilization changes depending on shake amount of an image capturing apparatus.

10. An image capturing apparatus comprising:
an image sensor configured to capture an optical image formed by an image capturing optical system; and
the image processing apparatus according to claim 1.

11. The image capturing apparatus according to claim 10, further comprising a sensor image stabilization unit configured to move the image sensor in a direction intersecting an optical axis of the image capturing optical system.

12. The image capturing apparatus according to claim 10, further comprising a controller configured to control movement of a correction lens that is included in the image capturing optical system and is movable in a direction intersecting an optical axis of the image capturing optical system.

13. An image processing apparatus comprising:
at least one processor or circuit configured to execute a plurality of tasks including:
an information read-out task configured to read out meta information added to recording image data which is generated by performing electronic image stabilization that clips a part of a frame image of a captured image data so as to reduce image blur; and
a post-processing task configured to perform post-processing on the recording image data,
wherein the post-processing task is configured to perform on the recording image data, as the post-processing, expansion processing based on the meta information including a) information on a compression rate of an anamorphic optical system that is an image capturing optical system used in the image capturing, and b) information on a clipping position of the image area in the electronic image stabilization.

14. The image processing apparatus according to claim 13, wherein:
the information read-out task is configured to further read out, as the meta information added to the recording image data, information on at least one of a clipping magnification ratio, a roll angle and distortion of each of the frame images; and
the post-processing task is configured to perform, on the frame images, as the post-processing, correction processing including at least one of roll correction and distortion correction based on the information on the at least one of the clipping magnification ratio, the roll angle and the distortion, the information on the compression rate, and the information indicating the center position.

15. The image processing apparatus according to claim 13, wherein, in the post-processing, a user interface for allowing a user to select one of the compression rate read out by the information read-out task and a compression rate designated separately from the read-out compression rate is displayed.

16. An image processing method comprising the steps of:
generating recording image data by performing, on each of frame images of captured image data generated by image capturing through an image capturing optical system, electronic image stabilization that clips a part of the frame image of the captured image data so as to reduce image blur; and
adding meta information to the recording image data,
wherein each frame image of the recording image data is data of image area clipped by the electronic image stabilization, and
wherein at the step of adding the information, when the image capturing optical system is an anamorphic optical system, the meta information including a) information on a compression rate of the anamorphic optical system, and b) information on a clipping position of the image area in the electronic image stabilization are added to the recording image data.

17. An image processing method comprising the steps of:
reading out meta information added to recording image data which is generated by performing electronic image stabilization that clips a part of a frame image of a captured image data so as to reduce image blur; and
performing post-processing on the recording image data,
wherein, at the step of performing the post-processing, expansion processing as the post-processing is performed on the recording image data based on the meta information including a) information on a compression rate of an anamorphic optical system that is an image capturing optical system used in the image capturing, and b) information on a clipping position of the image area in the electronic image stabilization.

* * * * *